Patented June 10, 1941

2,245,535

UNITED STATES PATENT OFFICE 2,245,535

PREPARATION OF LEUCO ESTERS OF VAT DYESTUFFS

Otto Stallmann, South Milwaukee, and Milton A. Prahl, Milwaukee, Wis., assignors to E. I. du Pont de Nemours & Company, Wilmington, Del., a corporation of Delaware No Drawing. Application January 24, 1938, Serial No. 186,752

6 Claims. (Cl. 260—355)

This invention relates to the preparation of leuco esters of vat dyestuffs, and more particularly to improvements in the process for preparing leuco sulfuric acid esters of vat dyestuffs and vattable anthraquinone intermediates, involving the preparation and use of a novel esterifying agent.

In general, the leuco sulfuric acid esters of vattable compounds, more particularly of the vat colors, and certain vattable anthraquinone intermediates have been prepared by using as the esterifying agent the pyridine-sulfurtrioxide compound or a compound which will react with pyridine to form the pyridine-sulfurtrioxide compound, such as chlorosulfonic acid, sodium chlorosulfonate, oleum, alkyl sulfuric acid halides, the alkali salts of pyrosulfuric acid or the chloride of pyrosulfuric acid. Although considerable progress has been made in the manufacture of these water soluble leuco sulfuric acid esters of vattable compounds, the cost of preparing them is still comparatively high. In the preparation of the pyridine-sulfurtrioxide compound involving the use of sulfurtrioxide liberating agents, one molecule of pyridine is always converted to a pyridine salt which is a useless by-product in the reaction. The presence of this by-product, as well as its formation materially increases the cost of the process because a large excess of pyridine must be employed as the solvent or diluent for the reaction to give the necessary fluidity to the reaction mass. The preparation of the pyridine-sulfurtrioxide compound from pyridine and sulfurtrioxide alone involves difficulties, which makes it desirable to avoid the use of this intermediate in isolated form if possible. Attempts have therefore been made to use other esterifying agents in the solubilization of these vattable compounds, such as amino sulfuric acid, sodium chloro acetate and meta benzoic acid sulfohalides.

It is an object of this invention to provide an improved process for the preparation of the leuco sulfuric acid esters of vattable compounds which permits the use of much less pyridine than has heretofore been required.

It is a further object of the invention to employ in the process for preparing leuco sulfuric acid esters of vattable compounds an esterifying agent which with pyridine forms a liquid addition product, at the temperature employed in the process which in turn serves in part as a suspending agent for the reactants.

A further object of the invention is to provide a process for esterifying leuco compounds, in which the compound from which the sulfate radical is obtained, is a solid at room temperature, is relatively inexpensive, and is commercially available, and can be handled with less hazard than the sulfonating agents heretofore employed in this process.

It is a further object of the invention to provide a new reactive pyridine compound which can be employed in the preparation of the sulfuric acid esters of vattable dyestuffs and of intermediates of the anthraquinone series.

It is a still further object of the invention to provide a new esterifying agent for use in the preparation of leuco sulfuric acid esters of vattable compounds which can also be used in the presence of metals where the starting material employed is in the ketonic form.

These objects are accomplished by employing in the esterification of leuco compounds the reaction product of carbylsulfate and pyridine which at the temperature of the reaction is a liquid and is obtainable by reacting one mole of technical carbylsulfate with at least two moles of pyridine at temperatures above 50° C.

This pyridine carbylsulfate addition product is an oily fluid at 50° when prepared from technical carbylsulfate, and when freed from excess pyridine it solidifies on cooling. It is soluble in water with decomposition and is insoluble in inert organic solvents such as benzene, toluene, etc., and practically insoluble in cold pyridine. We have found that this oily "pyridine carbylsulfate" addition compound reacts quite readily at 40 to 100° C., either with a leuco vat color in the absence of metals or with the ketonic vat dyestuff or anthraquinone intermediate in the presence of metals such as copper or zinc, to form complex leuco addition products which upon further treatment with dilute alkalies are converted to the alkali-metal salts of sulfuric acid esters of the corresponding leuco vat dyestuffs or leuco anthraquinone intermediates. The carbylsulfate is employed in these esterfication reactions in a similar manner to that heretofore described in the prior art where the pyridine sulfur trioxide compound is used; the reactions being carried out preferably in dry pyridine.

The following examples are given to illustrate the invention more fully. The parts used are by weight.

*Example 1*

30 parts of carbylsulfate are added under stirring to 200 parts of dry pyridine, allowing the temperature to rise to 50 to 60° C.

The mass is then cooled to 30 to 35° C. and 20 parts of the dry, pulverized stable leuco compound of Bz-2:Bz-2'-dimethoxy-dibenzanthrone described in U. S. Patent 2,148,042 are added within 15 minutes, while maintaining a flow of carbon dioxide gas over the surface of the reaction mass, to exclude the air.

The mass is then stirred for one-half hour at 45 to 50° C., heated for one hour at 80 to 82° C. and cooled to room temperature.

The bright red colored mass is then poured into an agitated solution containing 30 parts of soda ash in 500 parts of water. After stirring for one-half hour, the suspension is steam distilled free from pyridine in vacuo, and then filtered at room temperature.

The filtrate is heated to 60 to 70° C. and enough sodium chloride is added slowly under stirring to bring the concentration to 25% by volume of NaCl.

The disodium salt of the disulfuric acid ester of leuco-dimethoxydibenzanthrone precipitated in the form of well defined red crystals, is filtered off and the cake is milled to a 15% color paste, containing 2.5% of soda ash. The product dyes and prints in substantially the same strength and shade as the soluble leuco sulfuric acid ester of the dimethoxydibenzanthrone prepared with pyridine-sulfurtrioxide. The potassium salt of the leuco sulfuric acid ester may be obtained if the salting is carried out with potassium chloride, in which case only 15% of KCl is needed, since the potassium salt is somewhat less soluble.

*Example 2*

40 parts of carbylsulfate are added at 50 to 60° C. to 40 parts of dry pyridine and the mass is stirred for 20 minutes at 60° C. This mixture is then stirred into 60 parts of pyridine to which has been added 40 parts of the dry, pulverized stable leuco compound of Bz-2:Bz-2'-dimethoxy-dibenzanthrone as employed in Example 1 with the exclusion of air by means of illuminating gas.

The mass is heated under agitation at 55° to 60° C. for one-half hour, and then poured into 600 parts of a 10% soda ash solution.

After stirring for 15 minutes, the mass is steam distilled free from pyridine in vacuo. The residual solution is filtered and to the filtrate is added enough potassium chloride at 50-55° C. to bring the concentration to 15% by volume of KCl.

The precipitate, consisting of large red crystals, is filtered off, washed with 200 parts of a solution, containing 10% KCl and 5% K₂CO₃ and then milled to a 15% color paste.

*Example 3*

100 parts of a filter cake, containing the equivalent of 50 parts of the stable leuco compound of Bz-2:Bz-2'-dimethoxydibenzanthrone are suspended under a carbon dioxide atmosphere in 250 parts of wet technical pyridine.

The charge is distilled under agitation until free of water and until there is left in the still a total of 115 parts of a viscous, bright red colored liquid, which is then cooled to 60° C.

The pyridine-carbylsulfate addition product previously prepared by reacting 75 parts of carbylsulfate at 60° C. with 200 parts of dry pyridine, is then added to the mass at 60 to 63° C.

Agitation is continued for one-half hour at 60° C. and the mass is diluted with 1500 parts of cold water. The mass is agitated until the reaction product is precipitated in the form of large red crystals, which are filtered off and washed with 200 parts of cold water.

The filter cake is dissolved in 850 parts of a 5.9% soda ash solution and steam distilled free from pyridine in vacuo. The residual solution is clarified by filtration and the filtrate evaporated in vacuo to dryness, to give the disodium salt of the leuco-disulfuric acid ester of the Bz-2:Bz-2'-dimethoxydibenzanthrone in a mixture with soda ash. This product is stable under ordinary conditions and exhibits dyeing and printing properties substantially identical to those of the color pastes obtained according to Examples 1 and 2 above.

*Example 4*

54 parts of a paste equivalent to 25 parts dry stable leuco compound of the alkylation product of Bz-2:Bz-2'-dihydroxydibenzanthrone with ethylene dibromide (Example 7, U. S. Patent 2,148,042) are dehydrated in 200 parts of pyridine to a final weight of 50 parts by distilling to a temperature of 115°–117° C., in an atmosphere of carbon dioxide.

To this solution there are added at 50° C., 75 parts of the pyridine-carbylsulfate addition compound (which has been freed from any traces of pyridine-sulfurtrioxide by repeated extraction with pyridine at 60° C.), and 40 parts of dry pyridine.

The reaction mixture is agitated at 65° for one-half hour, then poured under agitation into 400 parts of cold water, stirred 3 hours and allowed to settle. It is then filtered and the filter cake is dissolved in 600 parts of a 5% Na₂CO₃ solution. The pyridine is removed by steam distillation in vacuo. The residual mass is filtered and the filtrate is diluted up to 1300 parts with water. It is then salted with 150 parts of potassium chloride at 40° C. The potassium salt of the leuco sulfuric acid ester is thus obtained as a red crystalline body which is water soluble and may be regenerated to the parent color by the usual method.

*Example 5*

25 parts of 2-acetylamino-3-chloroanthraquinone are vatted at 40 to 45° C. in 1250 parts of water, containing 25 parts of sodium hydroxide and 25 parts of sodium hydrosulfite.

After stirring the vat for one-half hour at 45° C., the leuco compound of 2-acetylamino-3-chlorothraquinone is precipitated out of solution by reducing the alkalinity of the vat through the addition of 25 parts of sodium bisulfite and enough carbon dioxide to complete the precipitation.

The crystalline leuco compound, thus obtained, is filtered off, washed free from inorganic salts and dried in vacuo at 100° C. 40 parts of carbylsulfate are added under stirring to 300 parts of dry pyridine at 30° C. and the dried and pulverized leuco compound is added. After heating for 15 minutes at 80° C., the mass is poured into 1500 parts of water containing 65 parts of soda ash and the suspension is steam distilled free from pyridine in vacuo.

The residual mass is filtered in order to remove any 2-acetylamino-3-chloroanthraquinone which may be present.

The known disodium salt of the disulfuric acid ester of 2-acetylamino-3-chloroanthrahydroquinone may be isolated by any of the known methods.

Example 6

20 parts of carbylsulfate are stirred into 150 parts of dry pyridine and the mass is heated for one-half hour at 65 to 70° C. 10 parts of dry, pulverized dimethoxyisodibenzanthrone and 10 parts of copper powder are then added slowly under agitation within one-half hour at 60 to 65° C.

After heating the mass for another two hours at 60 to 65° C., it is diluted with 1000 parts of cold water containing 40 parts of soda ash.

After stirring for one hour, the mass is steam distilled free from pyridine in vacuo and then filtered at 30° C.

The filter cake is washed free from inorganic salts with cold water and is then extracted with a hot solution of 20 parts of triethanolamine in 1000 parts of water at 70–80° C.

By evaporating the intensely red colored solution in vacuo, a color paste containing the triethanolamine salt of the disulfuric acid ester of leuco-dimethoxyisodibenzanthrone is obtained. It is identical with the product obtained by solubilizing the parent vat dye under similar conditions, with the use of the pyridine-sulfurtrioxide compound as esterification agent in place of the pyridine-carbylsulfate addition product.

Example 7

To 100 parts anhydrous pyridine, 13 parts carbylsulfate are added. This mixture is heated at 70° C. for 30 minutes, under thorough agitation. 10 parts of dimethoxydibenzanthrone are added, and then 10 parts copper powder are slowly introduced into the mixture during 1½ hours, while the reaction mixture is held at 65–70° C., and poured into a slurry of 1000 parts of water and ice. The complex is separated by decantation and slurried in a solution of 10 parts sodium hydroxide in 150 parts of ice water. When the complex has been completely decomposed, the solution is filtered from the precipitated cuprous oxide, and the pyridine removed from the clear red liquor by vacuum distillation at 35–40° C. and the residual concentrated solution is clarified by filtration. From this filtrate the color salt is salted out with 15% of its weight of potassium chloride. The dipotassium salt of the leuco sulfuric acid ester of dimethoxydibenzanthrone is filtered off in the form of well defined crystals.

Example 8

Where 10 parts of dibromodimethoxydibenzanthrone are employed in Example 7, the corresponding ester of the dibromodimethoxydibenzanthrone is obtained.

Example 9

10 parts of indigo are reacted as in Example 7. The ester is isolated according to the usual procedure. It is identical with the known sulfuric acid ester of leuco-indigo.

Example 10

10 parts of 1:1′-dimethyl-3:3′-dichlorothioindigo are reacted as in Example 7, yielding the sulfuric acid ester of the leuco parent dyestuff.

Example 11

10 parts of 2-acetylamino-3-chloroanthraquinone are reacted as in Example 7. After the solubilization is completed, the reaction mass is poured into 1000 parts of ice water, the complex is separated and decomposed with 8% sodium hydroxide solution, filtered, distilled for removal of pyridine, and the resulting solution of 2-acetylamino-3-chloroanthrahydroquinone-9:10 - disulfuric acid ester is salted out as the potassium salt with 15% potassium carbonate.

This ester salt after hydrolysis of the acetyl group, yields leuco-3:3′-dichloroindanthronetetra-sulfuric acid ester salt by the usual oxidation procedures.

It will be quite obvious to those skilled in the art that many modifications of the particular process described in the above examples may be made without departing from the spirit of this invention. The amounts of pyridine and the ratio of carbylsulfate to dry color may be varied within wide limits depending upon the particular character of the vattable compound which is to be esterified. As pointed out above, the esterification reaction may be carried out at a temperature of 40° C. It has been found that temperatures of at least 50° C. should be employed in the formation of the pyridine carbylsulfate compound, since in some cases at low temperatures complete reaction is not effected. In general, the modifications employed in the solubilization of these vattable compounds when pyridine sulfur trioxide is used may also be employed in the process being the pyridine-carbylsulfate compound. By the term "technical carbylsulfate" we refer to carbylsulfate, which may be prepared by direct union of sulfur trioxide and ethylene gas without further purification (American Chem. Soc. Journal 58, 294–295, 1936).

The carbylsulfate-pyridine addition product may be substituted for the pyridine sulfurtrioxide compound in the preparation of sulfuric acid esters of vat dyestuffs of the indigo and thioindigo series, and of either the dyestuffs or intermediates of the anthraquinone series, that can normally be esterified by the known processes.

By the expression "a reconvertible stable leuco derivative" as employed in the claims we refer to those reconvertible stable leuco derivatives obtainable by the process described in U. S. Patent 2,148,042.

We claim:

1. In the process for preparing the leuco sulfuric acid esters of vattable compounds, the improvement which consists in effecting the esterification with the reaction product of carbylsulfate and pyridine which is substantially identical with the product obtained by heating one mole of technical carbyl sulfate with at least two moles of pyridine at temperatures above 50° C.

2. In the process for preparing the leuco sulfuric acid esters of vattable compounds, the improvement which consists in reacting the vattable compound in its keto form in the presence of a metal normally used in the formation of leuco sulfuric acid esters, with the reaction product of carbylsulfate and pyridine which is substantially identical with the product obtained by heating one mole of technical carbyl sulfate with at least two moles of pyridine at temperatures above 50° C.

3. In the process for preparing the leuco sulfuric acid esters of vattable compounds, the improvement which consists in reacting the vattable compound in leuco form with the reaction product of carbylsulfate and pyridine which is substantially identical with the product obtained by heating one mole of technical carbyl sulfate with at least two moles of pyridine at temperatures above 50° C.

4. The process for preparing sulfuric acid esters of vattable compounds which comprises heating in pyridine to temperatures of at least 40° C. the leuco form of the vattable compound with the carbylsulfate-pyridine addition product which is substantially identical with the product obtained by heating one mole of technical carbylsulfate with at least two moles of pyridine at temperatures above 50° C., treating the resulting leuco sulfuric acid ester carbylsulfate-pyridine complex with an alkali, distilling off the pyridine and isolating the resulting alkali metal salt of the leuco sulfuric acid ester by a salting out procedure.

5. The process for preparing the sulfuric acid ester of Bz-2,Bz-2'-dimethoxydibenzanthrone which comprises heating in pyridine to temperatures of at least 40° C. the leuco form of the Bz-2,Bz-2'-dimethoxydibenzanthrone with the carbylsulfate-pyridine addition product which is substantially identical with the product obtained by heating one mole of technical carbylsulfate with at least two moles of pyridine at temperatures above 50° C., treating the resulting leuco sulfuric acid ester carbylsulfate-pyridine complex with an alkali and isolating the alkali metal salt of the leuco sulfuric acid ester of Bz-2,Bz-2'-dimethyoxydibenzanthrone.

6. The process for preparing the leuco sulfuric acid ester of Bz-2,Bz-2'-dimethoxydibenzanthrone which comprises dissolving a reconvertible stable leuco derivative of the dimethoxydibenzanthrone which is substantially identical with that obtained by reducing dimethoxydibenzanthrone in an alkaline hydrosulfite vat of pH of from 9 to 12 at a temperature of from 60° to 90° C., in pyridine and heating the solution to temperatures of at least 40° C. with the carbylsulfate-pyridine addition product which is substantially identical with the product obtained by heating one mole of technical carbylsulfate with at least two moles of pyridine at temperatures above 50° C., decomposing the resulting leuco sulfuric acid ester carbylsulfate-pyridine complex, and recovering the leuco sulfuric acid ester from the remaining solution.

OTTO STALLMANN.
MILTON A. PRAHL.